Patented Mar. 2, 1948

2,436,842

UNITED STATES PATENT OFFICE 2,436,842

INSULATING MATERIAL CONTAINING CYCLIZED RUBBER, A POLYOLEFINE, AND POLYSTYRENE

Arthur J. Warner, South Orange, and Myron Bakst, Newark, N. J., assignors to Federal Telephone and Radio Corporation, Newark, N. J., a corporation of Delaware No Drawing. Application October 26, 1942, Serial No. 463,418

4 Claims. (Cl. 260—4)

This invention relates to insulating materials and method of producing same, and more particularly to insulating compounds for use at ultrahigh frequencies.

An object of this invention is to produce an insulating material having low losses at ultrahigh frequencies.

Another object of this invention is to produce an insulating material having superior aging characteristics together with improved power factor and dielectric constant at ultra-high frequencies.

Still another object of this invention is to provide an insulating material for use at ultra-high frequencies, which can be made from more readily obtainable materials than comparable insulating compounds.

A further object of this invention is to produce an insulating material having improved flexibility, especially at low temperatures as compared to comparable insulating compounds.

A still further object of the invention is to provide a synthetic insulating material suitable for ultra-high frequency applications, which is extremely stable and which may be maintained at high temperatures with little tendency toward degradation.

Other objects will become apparent as the description proceeds.

It has heretofore been possible to produce synthetic insulating compounds which are well adapted for use at ultra-high frequencies, but which if subjected to high temperatures, as above 70° C. will become hard and brittle due to oxidation, loss of plasticizer, phase reversal, etc. It has also heretofore been possible to produce polymerized insulating materials in which the degradation at high temperatures is extremely slow, but these compounds have been unsuitable for use at ultra-high frequencies because of the poor electrical characteristics. In accordance with the present invention we have produced an insulating material which is both stable at high temperatures and which exhibits improved dielectric characteristics at ultra-high frequencies. By ultra-high frequencies, we mean frequencies in the range of 100 to 3000 megacycles, although it will be recognized that the composition is also suitable for lower frequency applications.

In accordance with a preferred method, the present invention contemplates mixing a polymerized aromatic vinyl hydrocarbon, a low molecular weight polymerized aliphatic mono-olefin, a high molecular weight polymerized aliphatic mono-olefin and a cyclized rubber in a suitable machine such as a "Banbury mixer," followed by a vigorous cold milling of the mix on a rubber or plastics sheeting mill. If desired, hydrocarbon materials such as paraffin wax, ceresin wax, etc., can be added to the mixture to act as extrusion aids.

A representative composition according to the present invention would comprise, by way of example, 10 parts by weight of cyclized rubber, 20 parts polyisobutylene of mean molecular weight 12,000, 20 parts of polyisobutylene of mean molecular weight 100,000, 50 parts of polystyrene of mean molecular weight 80,000 and 2 parts of paraffin wax. In the "Banbury mixer" this material is mixed into a uniform mass by specially designed rotors which tear the material, causing frictional heat in the process. A weight floats on the top of the material being compounded to insure that the material is thoroughly masticated. The temperature of the material in the "Banbury mixer" is raised to approximately 320° F. during the process, and after the material has been thoroughly mixed it is transferred to the cold mill, where the temperature is quickly dropped to approximately 90° F. The material is vigorously cold milled to ensure thorough dispersion of the polystyrene.

The use of polyisobutylene of two different molecular weights and the incorporation of 10% cyclized rubber in place of the more usual crepe rubber results in several advantages which are peculiar to the insulating material of the present invention.

We believe that the low molecular weight polyisobutylene plasticizes the high molecular weight polyisobutylene, giving a plastic material exhibiting little nerve. The cyclized rubber is soluble in the mixture and acts as a stiffening agent thereof, and we believe that it has the additional property of causing a bond between the dispersed polystyrene particles and the polyisobutylene matrix. Thus, our composition does not exhibit aggregation of the polystyrene particles at the elevated temperatures nor does it show brittleness on flexing, both of which phenomena occur in previously developed comparable materials.

The presence of the low molecular weight polyisobutylene has the additional advantage of conferring low temperature flexibility on the composition, while the high proportion of inert filler, namely, polystyrene, gives the composition rigidity at elevated temperatures. For example, a composition prepared as above showed no signs of brittleness at —40 degrees centigrade, while it withstood seven days' heating at 75 degrees centigrade without deformation or change in hardness.

The use of the above materials results in an improved power factor and dielectric constant at ultra-high frequencies over comparable insulating compositions. For example, a composition prepared as above had a power factor of about 0.0007 and a dielectric constant of about 2.40 when measured at 100 megacycles.

While the invention has been specifically described in connection with the use of polyisobutylenes and polystyrene, as was indicated above, polymerized aliphatic mono-olefins other than polyisobutylene are contemplated, while polymerized aromatic vinyl hydrocarbons, other than polystyrene, may be used. The aliphatic mono-olefins may include, generally speaking, the polymerized isomers of ethylene, butylene, propylene, amylene, hexylene, heptylene octylene, nonylene and decylene, of which polyisobutylene and polyethylene are preferred. The polymerized aromatic vinyl hydrocarbons may include compounds such as polymerized para methyl styrene, polymerized vinyl naphthalene, copolymers of styrene with alpha methyl para methyl styrene, etc. The cyclized rubber may be a tough, horny, flexible, substantially pure cyclized rubber hydrocarbon, having a power factor (at 1000 kilocycles) of .00019 and a dielectric constant of 3.49. It is described in United States Letters Patent 2,321,764 to James A. Mitchell as "practically pure cyclized rubber containing no chlorine or other impurity except those normally present in rubber, and having a softening point of 50° C.," and is further described in United States Letters Patent 2,230,359 to James P. McKenzie and United States Letters Patent 2,270,930 to Hugh J. Cameron. The invention is not limited in use to this particular type.

The percentage of the components of the compound of the present invention may also be varied. For example, the compound may include 5% to 20% cyclized rubber, approximately 10% to 30% low molecular weight polymerized aliphatic mono-olefin, 10% to 30% high molecular weight polymerized aliphatic mono-olefin, and 30% to 55% polymerized aromatic vinyl hydrocarbon. With respect to the percentage of the polymerized aromatic vinyl hydrocarbon, such as polystyrene, it has been found that the percentage should not be less than 40% if good resistance to flow at elevated temperatures is required, and, on the other hand, should not be greater than 55% if hardening after prolonged heating at high temperatures is to be avoided. The percentage of this material may be reduced to as low as 30% if resistance to flow at high temperatures is not essential. Typical preferred compositions using a 100 pound "Banbury mixer" for various percentages of polystyrene would be:

|   | Polystyrene | 12,000 M. W. Polyisobutylene | 100,000 M. W. Polyisobutylene | Cyclized Rubber |
|---|---|---|---|---|
|   | Pounds | Pounds | Pounds | Pounds |
| A | 30 | 25 | 25 | 20 |
| B | 45 | 21 | 21 | 13 |
| C | 55 | 20 | 20 | 5 |

It will be noted that for best results the percentages of cyclized rubber preferably vary the most with changes in the percentage of polystyrene, so that the sum of polystyrene and cyclized rubber falls within a range of 50% to 60% of the total, although other compositions showing a wider range in the percentage of the ingredients as indicated above, are also contemplated.

While the molecular weight of the high molecular weight polyisobutylene or other polymerized aliphatic mono-olefin has been given in the preferred example as 100,000, a material having a molecular weight within the range of 60,000 to 120,000 is suitable. The molecular weight of the low molecular weight polyisobutylene is approximately 12,000 while the mean molecular weight of the polystyrene is preferably around 80,000, although these figures are, of course, only indicative of the range of weights desired or preferred.

It is, of course, possible to include mineral fillers in the insulating compound described but such inclusion will necessarily adversely affect the electrical characteristics. Whereas we prefer the form of composition suitable as a dielectric for frequencies up to 3000 megacycles, the addition of mineral fillers would probably limit the range to approximately 100 megacycles. If the compound is not required to work at high frequencies, fillers such as talc, specially treated clays, etc., may be included.

While we have described our invention in connection with certain specific examples, it is to be clearly understood that such examples are not to be construed as a limitation on the scope of our invention, as set forth in the objects and in the accompanying claims.

We claim:

1. An electric insulating composition, characterized by stability of shape at high operating temperatures of about 75° C., flexibility at low operating temperatures of about —40° C., and good dielectric characteristics at ultra-high frequencies in the range of 100 to 3000 megacycles, that comprises essentially a substantially homogeneous mixture of 5% to 20% of tough, horny, flexible, substantially pure cyclized rubber hydrocarbon having a power factor at 1000 kilocycles of .00019 and a dielectric constant of 3.49, 10% to 30% polyisobutylene having a mean molecular weight of approximately 12,000, 10% to 30% of a polymerized substance having a mean molecular weight within the range of 60,000 to 120,000 chosen from the class consisting of polyethylene and polyisobutylene, and 30% to 55% of a substance having a mean molecular weight of about 80,000 selected from the class consisting of polystyrene, polymerized para methyl styrene, polymerized vinyl naphthalene and copolymers of styrene with alpha-methyl-para-methyl styrene.

2. An electric insulating composition, characterized by stability of shape at high operating temperatures of about 75° C., flexibility at low operating temperatures of about —40° C., and good dielectric characteristics at ultra-high frequencies in the range of 100 to 3000 megacycles, that comprises essentially a substantially homogeneous mixture of 5% to 20% of tough, horny, flexible, substantially pure cyclized rubber hydrocarbon having a power factor at 1000 kilocycles .00019 and a dielectric constant of 349, 10% to 30% polyisobutylene having a mean molecular weight of approximately 12,000, 10% to 30% of polyethylene having a mean molecular weight within the range of 60,000 to 120,000, and 30% to 55% of a substance having a mean molecular weight of about 80,000 selected from the class consisting of polystyrene, polymerized para methyl styrene, polymerized vinyl naphthalene and copolymers of styrene with alpha-methyl-para-methyl styrene.

3. An electric insulating composition, characterized by stability of shape at high operating temperatures of about 75° C., flexibility at low operating temperatures of about −40° C., and good dielectric characteristics at ultra-high frequencies in the range of 100 to 3000 megacycles, that comprises essentially a substantially homogeneous mixture of 5% to 20% of tough, horny, flexible, substantially pure cyclized rubber hydrocarbon having a power factor at 1000 kilocycles of .00019 and a dielectric constant of 3.49, 10% to 30% polyisobutylene having a mean molecular weight of approximately 12,000, 10% to 30% of polybutylene having a mean molecular weight within the range of 60,000 to 120,000, and 30% to 55% of a substance having a mean molecular weight of about 80,000 selected from the class consisting of polystyrene, polymerized para methyl styrene, polymerized vinyl naphthalene and copolymers of styrene with alpha-methyl-para-methyl styrene.

4. An ultra-high frequency electric insulating composition, characterized by stability of shape at high operating temperatures of about 75° C., flexibility at low operating temperatures of about −40° C., a power factor of 0.0007 and a dielectric constant of about 2.40 when measured at 100 megacycles, that comprises essentially a substantially homogeneous mixture of 10 parts by weight of tough, horny, flexible substantially pure cyclized rubber hydrocarbon having a power factor at 1000 kilocycles of .00019 and a dielectric constant of 3.49, 20 parts by weight of polyisobutylene having a mean molecular weight of about 12,000, 20 parts by weight of polyisobutylene having a mean molecular weight of about 100,000, and 50 parts by weight of polystyrene having a mean molecular weight of about 80,000.

ARTHUR J. WARNER.
MYRON BAKST.

REFERENCES CITED

The following references are of record in the file of this patent:

UNITED STATES PATENTS

| Number | Name | Date |
| --- | --- | --- |
| 2,184,966 | Gaylor | Dec. 26, 1939 |
| 2,213,423 | Gaylor | Sept. 3, 1940 |
| 2,272,036 | Dickson | Feb. 3, 1942 |
| 2,304,210 | Scott | Dec. 8, 1942 |
| 2,319,959 | Tierney | May 25, 1943 |
| 2,363,289 | Bergstein | Nov. 21, 1944 |
| 2,337,908 | Mack | Dec. 28, 1943 |
| 2,342,209 | Mitchell | Feb. 22, 1944 |
| 2,363,654 | Daly | Nov. 28, 1944 |
| 2,339,958 | Sparks | Jan. 25, 1944 |

FOREIGN PATENTS

| Number | Country | Date |
| --- | --- | --- |
| 839,494 | France | Jan. 4, 1939 |
| 507,323 | Great Britain | June 9, 1939 |